US011982194B2

(12) United States Patent
Chen et al.

(10) Patent No.: US 11,982,194 B2
(45) Date of Patent: May 14, 2024

(54) CMAS RESISTANT, HIGH STRAIN TOLERANT AND LOW THERMAL CONDUCTIVITY THERMAL BARRIER COATINGS AND THERMAL SPRAY COATING METHOD

(71) Applicant: OERLIKON METCO (US) INC., Westbury, NY (US)

(72) Inventors: Dianying Chen, Westbury, NY (US); Christopher G. Dambra, Flushing, NY (US); Mitchell R. Dorfman, Smithtown, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 0 days.

(21) Appl. No.: 16/978,047

(22) PCT Filed: Apr. 8, 2019

(86) PCT No.: PCT/US2019/026346
§ 371 (c)(1),
(2) Date: Sep. 3, 2020

(87) PCT Pub. No.: WO2019/199678
PCT Pub. Date: Oct. 17, 2019

(65) Prior Publication Data

US 2021/0140339 A1 May 13, 2021

Related U.S. Application Data

(60) Provisional application No. 62/654,985, filed on Apr. 9, 2018.

(51) Int. Cl.
*C23C 4/073* (2016.01)
*C23C 4/11* (2016.01)
(Continued)

(52) U.S. Cl.
CPC .............. *F01D 25/00* (2013.01); *C23C 4/073* (2016.01); *C23C 4/11* (2016.01); *C23C 4/134* (2016.01);
(Continued)

(58) Field of Classification Search
None
See application file for complete search history.

(56) References Cited

U.S. PATENT DOCUMENTS 5,073,433 A 12/1991 Taylor
5,830,586 A 11/1998 Gray
(Continued)

FOREIGN PATENT DOCUMENTS

CN 101012123 8/2007
CN 101070246 11/2007
(Continued)

OTHER PUBLICATIONS

Harder et al., "Plasma Spray-Physical Vapor Deposition (PS-PVD) of Ceramics for Protective Coatings", https://ntrs.nasa.gov/archive/nasa/casi.ntrs.nasa.gov/20110008752.pdf, 2011.
(Continued)

*Primary Examiner* — Elizabeth Collister
(74) *Attorney, Agent, or Firm* — GREENBLUM & BERNSTEIN, P.L.C.

(57) ABSTRACT

An erosion and CMAS resistant coating arranged on a TBC coated substrate and including at least one porous vertically cracked (PVC) coating layer providing lower thermal conductivity and being disposed over a layer of MCrAlY wherein M represents Ni, Co or their combinations. At least one dense vertically cracked (DVC) erosion and CMAS resistant coating layer is deposited over the at least one PVC coating layer.

17 Claims, 2 Drawing Sheets

(51) Int. Cl.

| | |
|---|---|
| ***C23C 4/134*** | (2016.01) |
| ***C23C 28/00*** | (2006.01) |
| ***C23C 30/00*** | (2006.01) |
| ***F01D 25/00*** | (2006.01) |

(52) U.S. Cl.

CPC ...... *C23C 28/3215* (2013.01); *C23C 28/3455* (2013.01); *C23C 30/00* (2013.01); *F05D 2220/32* (2013.01); *F05D 2230/312* (2013.01); *F05D 2230/313* (2013.01); *F05D 2230/90* (2013.01); *F05D 2300/611* (2013.01)

(56) References Cited

U.S. PATENT DOCUMENTS

| | | | | |
|---|---|---|---|---|
| 6,177,200 | B1 | 1/2001 | Maloney | |
| 6,703,137 | B2 | 3/2004 | Subramanian | |
| 7,875,370 | B2 | 1/2011 | Schlichting | |
| 8,197,950 | B2 | 6/2012 | Taylor | |
| 8,470,460 | B2 | 6/2013 | Lee | |
| 9,023,486 | B2 | 5/2015 | Nagaraj | |
| 2006/0115659 | A1 | 1/2006 | Hazel et al. | |
| 2009/0169752 | A1 | 7/2009 | Fu et al. | |
| 2011/0014060 | A1 | 1/2011 | Bolcavage et al. | |
| 2011/0086177 | A1 | 4/2011 | Ma | |
| 2012/0034491 | A1 | 2/2012 | Hongoh | |
| 2013/0224457 | A1* | 8/2013 | Lee | C09D 1/02 428/215 |
| 2014/0178632 | A1 | 6/2014 | Taylor | |
| 2015/0147524 | A1 | 5/2015 | Petorak | |
| 2015/0159507 | A1 | 6/2015 | Sivaramakrishnan et al. | |
| 2016/0348226 | A1 | 12/2016 | Chen | |
| 2017/0145836 | A1* | 5/2017 | Sivaramakrishnan | C23C 4/11 |
| 2017/0362692 | A1* | 12/2017 | Wolfe | C23C 10/60 |

FOREIGN PATENT DOCUMENTS

| | | |
|---|---|---|
| EP | 3453781 | 3/2019 |
| JP | 2011-508092 | 3/2011 |
| JP | 2013-540887 | 11/2013 |
| JP | 2015-501375 | 1/2015 |
| JP | 2017-515968 | 6/2017 |

OTHER PUBLICATIONS

Int'l Search Report (Form PCT/ISA/220 & 210) conducted in Int'l Appln. No. PCT/US2019/026346 (dated Jun. 26, 2019).

Int'l Written Opinion (Form PCT/ISA/237) conducted in Int'l Appln. No. PCT/US2019/026346 (dated Jun. 26, 2019).

Europe Search Report/Office Action conducted in counterpart Europe Appln. No. EP 19785676 (dated Dec. 21, 2021).

Viswanathan et al., "Multilayer, Multimaterial Thermal Barrier Coating Systems: Design, Synthesis, and Performance Assessment," Journal of the Amer. Ceramic Soc., vol. 98, No. 6, Mar. 25, 2015, XP055619883, pp. 1769-1777.

China Search Report/Office Action conducted in counterpart China Appln. No. 2019800225059 (dated Aug. 16, 2022) (w/ Translation).

Japan Office Action conducted in counterpart Japan Appln. No. 2020-551460 (dated Mar. 1, 2023) (w/ Translation).

* cited by examiner

CMAS RESISTANT, HIGH STRAIN TOLERANT AND LOW THERMAL CONDUCTIVITY THERMAL BARRIER COATINGS AND THERMAL SPRAY COATING METHOD

CROSS-REFERENCE TO RELATED APPLICATIONS

The instant application claims priority under 35 U.S.C. § 119(e) of U.S. provisional Patent Application No. 62/654,985 filed on Apr. 9, 2018, the disclosure of which is expressly incorporated by reference herein in its entirety.

STATEMENT REGARDING SPONSORED RESEARCH OR DEVELOPMENT

Not Applicable.

BACKGROUND OF THE INVENTION

Field of the Invention

The invention is an erosion and Calcium-Magnesium-Aluminum-Silicate (CMAS) resistant multilayer ceramic coating for improving the CMAS degradation issue of thermal barrier coating (TBC) that overlies a superalloy substrate. The multilayer coating can include an erosion and CMAS resistant dense vertically cracked (DVC) top coat and a low thermal conductivity and strain tolerant porous vertically cracked (PVC) intermediate coating. A coating method is also disclosed.

Description of Related Art

Thermal barrier coatings (TBCs) have been applied onto hot section components of gas turbine engines for protection in high temperature. Eight weight percent (8 wt %) Yttria stabilized zirconia (8YSZ) has been the historical composition for TBCs due to its high toughness and its low thermal conductivity up to high temperatures. Non-limiting examples include Metco 222A, 231A, 233A, 233B, 233C and 234A. However, with engine operating temperatures increasing, molten siliceous deposits generically known as CMAS attack the 8YSZ TBCs and have been recognized as a critical factor affecting TBCs durability, and are a fundamental barrier to progress in gas turbine technology. Various mitigation strategies to the problem of CMAS degradation have been attempted. The most promising strategy seeks to increase the reactivity between the coating and the CMAS melt. These reactions consume the melt while the crystalline reaction products form a dense layer and block the paths for further melt infiltration. Most of these CMAS reactive TBCs are based on the rare earth zirconates. However these compositions typically have a lower toughness than the 8YSZ coatings. Therefore, a new strategy to increase CMAS resistant TBCs durability, while keeping the TBCs low thermal conductivity and high toughness, is essential.

It is also known in the art to employ yttria stabilized zirconia (YSZ) thermal barrier coatings and these have been successfully used in the gas turbine engines for decades. Non-limiting examples include Metco 6608 and 6609.

The following documents, which are each herein expressly incorporated by reference in their entireties, disclose various types of DVC coatings; U.S. Pat. No. 8,197,950 to Taylor, issued on Jun. 12, 2012; U.S. Pat. No. 5,073,433 to Taylor, issued on Dec. 17, 1991; US 2014/0178632 to Taylor, published on Jun. 26, 2014; U.S. Pat. No. 5,830,586 to Gray, issued on Nov. 3, 1998; and U.S. Pat. No. 6,703,137 to Subramanian, issued on Mar. 9, 2004.

The following documents, which are each herein expressly incorporated by reference in their entireties, disclose various types of CMAS resistant coatings; U.S. Pat. No. 6,177,200 to Maloney, issued on Jan. 23, 2001; U.S. Pat. No. 7,875,370 to Schlichting, issued on Jan. 25, 2011; US 2012/0034491 to Hongoh, published on Feb. 9, 2012; and U.S. Pat. No. 9,023,486 to Nagaraj, issued on May 5, 2015.

The following document, which is herein expressly incorporated by reference in its entirety, discloses a PVC coating; US 2016/0348226 to Chen, published on Dec. 1, 2016.

SUMMARY OF THE INVENTION

The invention encompasses an erosion and CMAS resistant multilayer ceramic coating for improving the CMAS degradation issue of TBC. A coating method is also disclosed.

The invention also encompasses a coating system wherein one or more TBC layers are first applied onto a superalloy substrate. Then, one or more low thermal conductivity strain tolerant layers are applied which are porous vertically cracked (PVC) coating layers. Finally, one or more dense vertically cracked (DVC) erosion and CMAS resistant coating layers are applied or deposited as a top layer.

In embodiments, the porosity of the DVC layer(s) can be 0% to 5% and the cracks can extend either partially through the thickness of the layer(s), i.e., less than 50% of the thickness, or about 50% of the thickness, and can even extend through an entire thickness of the layer(s). In embodiments, the cracks can be substantially vertical cracks and can range between 20 and 200 cracks per inch.

In embodiments, the porosity of the PVC layer(s) can be 5% to 25% and the cracks can extend either partially through the thickness of the layer(s), i.e., less than 50% of the thickness, or about 50% of the thickness, and can even extend through an entire thickness of the layer(s). In embodiments, the cracks can be substantially vertical cracks and can range between 20 and 200 cracks per inch.

With this invention, the TBC or coating lifespan can be extended which extends and improves engine working life.

In embodiments of the present disclosure, a strain tolerant DVC coating top layer and the underlying PVC coating system is used to protect the TBC system. The DVC/PVC layers can be composed of tough rare earth element (Re) stabilized $ZrO_2$ or $HfO_2$ mixed with a CMAS resistant chemistry composition. As used herein, CMAS resistant chemistry means any chemical composition that can react with the CMAS dust and form a crystalline phase to prevent the CMAS further penetration to the coating or the chemical composition which can improve the CMAS melting temperature after reacting with CMAS. The DVC layers provide erosion resistance and the PVC layers decreasing the thermal conductivity.

Main advantages of the invention include the tough Re stabilized $ZrO_2$ or $HfO_2$ mixed with CMAS resistant chemistry to improve the erosion and CMAS resistance of the TBC system. In addition, a PVC strain tolerant transition layer provides lower thermal conductivity.

Non-limiting embodiments of the DVC top layer(s) and/or the PVC layer(s), with the DVC being erosion and CMAS resistant and with the PVC being a thermal barrier and CTE (Coefficient of Thermal Expansion) mitigation layer, include the following (with exemplary rare earth oxides including Yttrium oxide, Lanthanum oxide, Cerium oxide, Praseodymium oxide, Neodymium oxide, Samarium oxide, Europium oxide, Gadolinium oxide, terbium oxide, Dysprosium oxide, holmium oxide, erbium oxide, ytterbium oxide, Lutetium oxide, Scandium oxide, Thulium oxide):

RE stabilized $ZrO_2$ or $HfO_2$ (RE=rare earth oxides)

RE stabilized $ZrO_2$ or $HfO_2$ mixture with Rare earth oxides; or

RE stabilized $ZrO_2$ or $HfO_2$ mixture with Rare earth Silicate; or

RE stabilized $ZrO_2$ or $HfO_2$ mixture with Rare earth Aluminate; or

RE stabilized $ZrO_2$ or $HfO_2$ mixture with Rare earth Aluminate Silicate; or

RE stabilized $ZrO_2$ or $HfO_2$ mixture with alkaline oxides; or

RE stabilized $ZrO_2$ or $HfO_2$ mixture with Gadolinium Zirconate; or

Any combinations of the above.

The DVC top layer(s) or coating can have a CTE of ~$9\times10^{-6}$/degrees C. to $13\times10^{-6}$/degrees C., as well as a thickness of between 2 mils (0.002 inches) and 40 mils (0.040 inches). As used herein, a mil is equal to 0.001 inches. This layer or coating can be applied by atmospheric plasma spraying (APS), plasma spray-physical vapor deposition (PS-PVD) or suspension plasma spray (SPS).

The PVC intermediate layer(s) or coating can have a CTE of ~$9\times10^{-6}$/degrees C. to $13\times10^{-6}$/degrees C., as well as a thickness of between 1 mil and 40 mils. This layer or coating can be applied by atmospheric plasma spraying (APS), plasma spray-physical vapor deposition (PS-PVD) or suspension plasma spray (SPS).

The bond coating layer(s) or coating can be MCrAlY (M=Co, Ni), with a thickness of between 2 mils and 13 mils. This layer or coating can be applied by atmospheric plasma spraying (APS), high velocity oxy-fuel (HVOF), high velocity air-fuel (HVAF), plasma spray-physical vapor deposition (PS-PVD) or suspension thermal spray.

Non-limiting embodiments of the invention include an erosion and CMAS resistant coating arranged on an TBC coated substrate comprising at least one porous vertically cracked (PVC) coating layer providing low thermal conductivity and that is disposed over the TBC coated substrate and at least one dense vertically cracked (DVC) erosion and CMAS resistant coating layer deposited over the at least one PVC coating layer.

In non-limiting embodiments, the at least one DVC layer is a top layer. The coating layer may further comprise at least one bond coating layer disposed between the TBC and the substrate. The substrate may be a superalloy substrate.

The at least one dense vertically cracked (DVC) erosion and CMAS resistant coating layer may comprise RE stabilized $ZrO_2$ or $HfO_2$. The at least one dense vertically cracked (DVC) erosion and CMAS resistant coating layer may comprise RE stabilized $ZrO_2$ or $HfO_2$ mixed with rare earth silicate. The at least one dense vertically cracked (DVC) erosion and CMAS resistant coating layer may comprise Re stabilized $ZrO_2$ or $HfO_2$ mixed with rare earth aluminate. The at least one dense vertically cracked (DVC) erosion and CMAS resistant coating layer may comprise Re stabilized $ZrO_2$ or $HfO_2$ mixed with rare earth aluminate or silicate. The at least one dense vertically cracked (DVC) erosion and CMAS resistant coating layer may comprise Re stabilized $ZrO_2$ or $HfO_2$ mixed with alkaline oxide. The at least one dense vertically cracked (DVC) erosion and CMAS resistant coating layer may comprise Re stabilized $ZrO_2$ or $HfO_2$ mixed with gadolinium zirconate. The at least one dense vertically cracked (DVC) erosion and CMAS resistant coating layer may comprise a mixture of one or more compositions described above.

The at least one dense vertically cracked (DVC) erosion and CMAS resistant coating layer may comprise full thickness vertical cracks. The at least one porous vertically cracked (PVC) coating layer may comprise full thickness vertical cracks.

Non-limiting embodiments of the invention include an erosion and CMAS resistant coating arranged on an TBC coated substrate comprising at least one porous vertically cracked (PVC) thermal barrier coating layer providing lower thermal conductivity and that is disposed over the MCrAlY coated substrate and a top layer of dense vertically cracked (DVC) erosion and CMAS resistant coating material deposited over the at least one PVC thermal barrier coating layer.

In non-limiting embodiments, the coating may further comprise at least one bond coating layer disposed between the TBC and the substrate. The substrate may be a superalloy substrate.

The at least one dense vertically cracked (DVC) erosion and CMAS resistant coating layer may comprise Re stabilized $ZrO_2$ or $HfO_2$ mixed with rare earth oxide. The at least one dense vertically cracked (DVC) erosion and CMAS resistant coating layer may comprise Re stabilized $ZrO_2$ or $HfO_2$ mixed with rare earth silicate. The at least one dense vertically cracked (DVC) erosion and CMAS resistant coating layer may comprise Re stabilized $ZrO_2$ or $HfO_2$ mixed with rare earth aluminate. The at least one dense vertically cracked (DVC) erosion and CMAS resistant coating layer may comprise Re stabilized $ZrO_2$ or $HfO_2$ mixed with rare earth aluminate or silicate. The at least one dense vertically cracked (DVC) erosion and CMAS resistant coating layer may comprise Re stabilized $ZrO_2$ or $HfO_2$ mixed with alkaline oxide. The at least one dense vertically cracked (DVC) erosion and CMAS resistant coating layer may comprise Re stabilized $ZrO_2$ or $HfO_2$ mixed with gadolinium zirconate. The at least one dense vertically cracked (DVC) erosion and CMAS resistant coating layer may comprise a mixture of one or more compositions described above.

The at least one dense vertically cracked (DVC) erosion and CMAS resistant coating layer may comprise full thickness vertical cracks. The at least one porous vertically cracked (PVC) coating layer may comprise full thickness vertical cracks.

Non-limiting embodiments of the invention include an erosion and CMAS resistant ceramic coating arranged on a superalloy substrate comprising an TBC coating layer bonded to the substrate, a porous vertically cracked (PVC) ceramic coating layer providing lower thermal conductivity that is directly deposited on the TBC coating layer and a dense vertically cracked (DVC) erosion and CMAS resistant coating layer deposited directly on the PVC coating layer. In embodiments, the TBC coating layer includes a layer of MCrAlY, wherein M represents Ni, Co or their combinations.

Non-limiting embodiments of the invention include a method of plasma spraying an erosion and CMAS resistant coating on an TBC coated substrate, comprising depositing at least one porous vertically cracked (PVC) thermal barrier coating layer providing lower thermal conductivity onto the TBC coated substrate and depositing a dense vertically cracked (DVC) erosion and CMAS resistant coating material over the at least one PVC thermal barrier coating layer.

In embodiments, the TBC coated substrate may comprise at least one bond coating layer arranged between an TBC layer and the substrate. The plasma spraying may comprise one of atmospheric plasma spraying (APS), plasma spray-physical vapor deposition (PS-PVD), or suspension plasma spray (SPS).

Another aspect of the invention provides an erosion and CMAS resistant coating is arranged on an TBC coated substrate, comprising: at least one porous vertically cracked (PVC) thermal barrier coating layer providing lower thermal conductivity disposed over the TBC coated substrate; and a top layer of dense vertically cracked (DVC) erosion and CMAS resistant coating material deposited over the at least one PVC thermal barrier coating layer.

In an embodiment the coating further comprising at least one bond coating layer disposed between the TBC and the substrate.

In an embodiment of the coating the TBC comprises at least one layer of MCrAlY wherein M represents Ni, Co or their combinations.

In an embodiment of the coating the at least one dense vertically cracked (DVC) erosion and CMAS resistant coating layer comprises Re stabilized $ZrO_2$ or $HfO_2$ mixed with rare earth oxide.

In an embodiment of the coating the at least one dense vertically cracked (DVC) erosion and CMAS resistant coating layer comprises Re stabilized $ZrO_2$ or $HfO_2$ mixed with rare earth silicate.

In an embodiment of the coating the at least one dense vertically cracked (DVC) erosion and CMAS resistant coating layer comprises Re stabilized $ZrO_2$ or $HfO_2$ mixed with rare earth aluminate.

In an embodiment of the coating the at least one dense vertically cracked (DVC) erosion and CMAS resistant coating layer comprises Re stabilized $ZrO_2$ or $HfO_2$ mixed with rare earth aluminate or silicate.

In an embodiment of the coating the at least one dense vertically cracked (DVC) erosion and CMAS resistant coating layer comprises Re stabilized $ZrO_2$ or $HfO_2$ mixed with alkaline oxide.

In an embodiment of the coating the at least one dense vertically cracked (DVC) erosion and CMAS resistant coating layer comprises Re stabilized $ZrO_2$ or $HfO_2$ mixed with gadolinium zirconate.

In an embodiment of the coating the at least one dense vertically cracked (DVC) erosion and CMAS resistant coating layer comprises a mixture of two or more of:

- Re stabilized $ZrO_2$ or $HfO_2$ mixed with rare earth oxide;
- Re stabilized $ZrO_2$ or $HfO_2$ mixed with rare earth silicate;
- Re stabilized $ZrO_2$ or $HfO_2$ mixed with rare earth aluminate;
- Re stabilized $ZrO_2$ or $HfO_2$ mixed with rare earth aluminate or silicate;
- Re stabilized $ZrO_2$ or $HfO_2$ mixed with alkaline oxide; and
- Re stabilized $ZrO_2$ or $HfO_2$ mixed with gadolinium zirconate.

In an embodiment of the coating the top layer of dense vertically cracked (DVC) erosion and CMAS resistant coating layer comprises full thickness vertical cracks.

In embodiment of the coating the at least one porous vertically cracked (PVC) coating layer comprises full thickness vertical cracks.

In yet another aspect of the invention an erosion and CMAS resistant ceramic coating is arranged on a superalloy substrate, comprising: a TBC coating layer of MCrAlY bonded to the substrate, wherein M represents Ni, Co or their combinations; a porous vertically cracked (PVC) ceramic coating layer providing CTE mitigation directly deposited on the TBC coating layer; and a dense vertically cracked (DVC) erosion and CMAS resistant coating layer deposited directly on the PVC coating layer.

In yet another aspect of the invention a method of plasma spraying an erosion and CMAS resistant coating on an TBC coated substrate is provided, the method comprising: depositing at least one porous vertically cracked (PVC) thermal barrier coating layer providing lower thermal conductivity onto the TBC coated substrate; and depositing a dense vertically cracked (DVC) erosion and CMAS resistant coating material over the at least one PVC thermal barrier coating layer.

In an embodiment of the method the TBC coated substrate comprises at least one bond coating layer arranged between an TBC layer and the substrate.

In an embodiment of the method the plasma spraying comprises one of: atmospheric plasma spraying (APS); plasma spray-physical vapor deposition (PS-PVD); or suspension plasma spray (SPS).

Yet another aspect of the invention provides an erosion and CMAS resistant coating comprising: at least one porous vertically cracked (PVC) coating layer providing low thermal conductivity disposed over a thermal barrier coating (TBC) that includes a layer of NiCrAlY; and at least one dense vertically cracked (DVC) erosion and CMAS resistant coating layer deposited over the at least one PVC coating layer.

Yet another aspect of the invention provides a n erosion and CMAS resistant coating comprising: at least one porous vertically cracked (PVC) coating layer providing low thermal conductivity disposed over a thermal barrier coating (TBC) that includes a layer of CoCrAlY; and at least one dense vertically cracked (DVC) erosion and CMAS resistant coating layer deposited over the at least one PVC coating layer.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the figures.

DETAILED DESCRIPTION OF THE INVENTION

Figure 1:
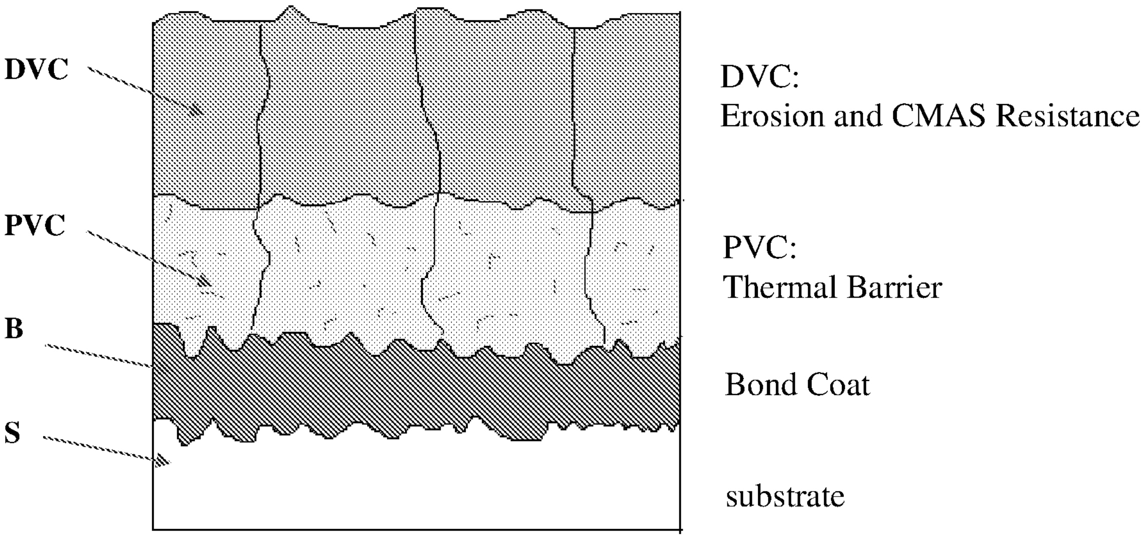
FIG. 1 schematically shows a multi-layer coating in accordance with the invention.

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure and are not limiting of the present disclosure nor are they necessarily drawn to scale.

The novel features which are characteristic of the disclosure, both as to structure and method of operation thereof, together with further aims and advantages thereof, will be understood from the following description, considered in connection with the accompanying drawings, in which an embodiment of the disclosure is illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms “a,” “an,” and “the” include the plural reference unless the context clearly dictates otherwise. For example, reference to “a powder material” would also mean that mixtures of one or more powder materials can be present unless specifically excluded. As used herein, the indefinite article “a” indicates one as well as more than one and does not necessarily limit its referent noun to the singular.

Except where otherwise indicated, all numbers expressing quantities used in the specification and claims are to be understood as being modified in all examples by the term “about.” Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms “about” and “approximately” indicate that the amount or value in question may be the specific value designated or some other value in its neighborhood. Generally, the terms “about” and “approximately” denoting a certain value is intended to denote a range within ±5% of the value. As one example, the phrase “about 100” denotes a range of 100±5, i.e. the range from 95 to 105. Generally, when the terms “about” and “approximately” are used, it can be expected that similar results or effects according to the disclosure can be obtained within a range of ±5% of the indicated value.

As used herein, the term “and/or” indicates that either all or only one of the elements of said group may be present. For example, “A and/or B” shall mean “only A, or only B, or both A and B”. In the case of “only A”, the term also covers the possibility that B is absent, i.e. “only A, but not B”.

The term “at least partially” is intended to denote that the following property is fulfilled to a certain extent or completely.

The terms “substantially” and “essentially” are used to denote that the following feature, property or parameter is either completely (entirely) realized or satisfied or to a major degree that does not adversely affect the intended result.

The term “comprising” as used herein is intended to be non-exclusive and open-ended. Thus, for example a composition comprising a compound A may include other compounds besides A. However, the term “comprising” also covers the more restrictive meanings of “consisting essentially of” and “consisting of”, so that for example “a composition comprising a compound A” may also (essentially) consist of the compound A.

The various embodiments disclosed herein can be used separately and in various combinations unless specifically stated to the contrary.

The invention is described with reference to FIG. 1 which schematically shows a multi-layer coating. As is evident in FIG. 1, the multi-layer coating utilizes a top coating layer that is a strain tolerant DVC coating top layer. This layer is disposed over an underlying PVC coating system which is used to decrease the thermal conductivity of the layers. The DVC/PVC layers can be composed of tough rare earth element (Re) stabilized $ZrO_2$ or $HfO_2$ mixed with a CMAS resistant chemistry composition. The one or more DVC layers provide erosion resistant and the one or more PVC layers provide the CTE mitigation between the one or more high CTE top layer and the one or more low CTE bottom layers of TBC. The DVC and PVC layer(s) are arranged over a bond coating B and substrate S.

The DVC layer(s) can be composed of tough Re stabilized $ZrO_2$ or $HfO_2$ mixed with CMAS resistant chemistry to improve the erosion and CMAS resistance of the TBC/CMC system. In addition, the PVC strain tolerant transition layer (s) provides CTE mitigation between the high CTE top layer(s) (DVC layer) and the low CTE bottom layer(s) TBC. Next, PVC microstructure further reduces thermal conductivity of the TBC system.

Non-limiting embodiments of the DVC top layer(s) and/or the PVC layer(s), with the DVC being erosion and CMAS resistant and with the PVC being a thermal barrier and CTE mitigation layer, include the following (with exemplary rare earth oxides including Yttrium oxide, Lanthanum oxide, Cerium oxide, Praseodymium oxide, Neodymium oxide, Samarium oxide, Europium oxide, Gadolinium oxide, terbium oxide, Dysprosium oxide, holmium oxide, erbium oxide, ytterbium oxide, Lutetium oxide, Scandium oxide, Thulium oxide):

- Re stabilized $ZrO_2$ or $HfO_2$
- Re stabilized $ZrO_2$ or $HfO_2$ mixture with Rare earth oxides; or
- Re stabilized $ZrO_2$ or $HfO_2$ mixture with Rare earth Silicate; or
- Re stabilized $ZrO_2$ or $HfO_2$ mixture with Rare earth Aluminate; or Re stabilized $ZrO_2$ or $HfO_2$ mixture with Rare earth Aluminate Silicate; or Re stabilized $ZrO_2$ or $HfO_2$ mixture with alkaline oxides; or Re stabilized $ZrO_2$ or $HfO_2$ mixture with Gadolinium Zirconate; or Any combinations of the above.

The DVC top layer(s) or coating can have a CTE of ~$9\times10^{-6}$/degrees C. to $13\times10^{-6}$/degrees C., as well as a thickness of between 2 mils and 40 mils. This layer or coating can be applied by atmospheric plasma spraying (APS), plasma spray-physical vapor deposition (PS-PVD) or suspension plasma spray (SPS).

The PVC intermediate layer(s) or coating can have a CTE of ~$9\times10^{-6}$/degrees C. to $13\times10^{-6}$/degrees C., as well as a thickness of between 1 mil and 40 mils. This layer or coating can be applied by atmospheric plasma spraying (APS), plasma spray-physical vapor deposition (PS-PVD) or suspension plasma spray (SPS).

The bond coating layer(s) or coating B can be MCrAlY (M=Ni, CO) as well as have a thickness of between 2 mils and 13 mils. This layer or coating can be applied by atmospheric plasma spraying (APS), high velocity oxy-fuel (HVOF), high velocity air-fuel (HVAF), plasma spray-physical vapor deposition (PS-PVD) or suspension thermal spray.

In embodiments, the porosity of the DVC layer(s) can be 0% to 5% and the cracks can extend either partially through the thickness of the layer(s), i.e., less than 50% of the thickness, or about 50% of the thickness, and can even extend through an entire thickness of the layer(s). In embodiments, the cracks can be substantially vertical cracks and can range between 20 and 200 cracks per inch or linear inch. In non-limiting embodiments, the DVC layer(s) can also be of a type known in the art and described in one or more of the herein incorporated documents.

In embodiments, the porosity of the PVC layer(s) can be 5% to 25% and the cracks can extend either partially through the thickness of the layer(s), i.e., less than 50% of the thickness, or about 50% of the thickness, and can even extend through an entire thickness of the layer(s). In embodiments, the cracks can be substantially vertical cracks and can range between 20 and 200 cracks per inch or linear inch. In non-limiting embodiments, the PVC layer(s) can also be of a type known in the art and described in one or more of the herein incorporated documents.

Non-Limiting Examples

Figure 2:
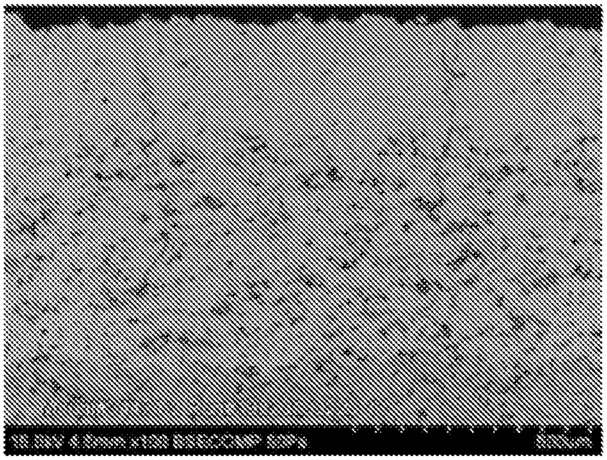
FIG. 2 shows a scanning electron microscope (SEM) cross-section of an applied multi-layer coating in accordance with the invention.

The follow tables include a description of the coating system shown in FIGS. 1 and 2 as well as the parameters used to form the same with a Sinplex Plasma Torch.

| Layer | Chemistry composition | Thickness range | Plasma torch | Process |
|---|---|---|---|---|
| Super-alloy S (sub-strate) | Ni based alloy | 3 mm | n/a | n/a |
| bond coat B (bond coat) | NiCrAlY | ~200 um | SinplexPro ™ | Ar/H2 plasma gas |
| PVC | 7YSZ | ~400 um | SinplexPro ™ | Ar/H2 plasma gas |
| DVC | Gd2Zr2O7 | ~200 um | SinplexPro ™ | Ar/H2 plasma gas |

-continued

| | | Bond coat layer | PVC layer | DVC layer |
|---|---|---|---|---|
| Material | | Amdry 386-4 | See Examples below | |
| Composition | | NiCrAlYHfSi | 8YSZ | Gd2Zr2O7 |
| Gun current | Amps | 450 | 540 | 500 |
| Voltage | Volts | 80.5 | 106 | 91 |
| Gun power | kW | 37 | 57 | 46 |
| Argon flow | Nlpm | 50 | 90 | 70 |
| Hydrogen flow | Nlpm | 2 | 7.5 | 5 |
| Powder feed rate | g/min × 1 | 50 | 90 | 40 |

The follow tables include a description of another coating system according to the invention as well as the parameters used to form the same with a Sinplex Plasma Torch.

| Layer | Chemistry composition | Thickness range | Plasma torch | Process |
|---|---|---|---|---|
| Superalloy S (substrate) | Ni or Co based alloy | 3 mm | n/a | n/a |
| bond coat B (bond coat) | CoNiCrAlY | ~200 um | SinplexPro ™ | Ar/H2 plasma gas |
| PVC | 7YSZ | ~400 um | SinplexPro ™ | Ar/H2 plasma gas |
| DVC | Gd2Zr2O7 | ~200 um | SinplexPro ™ | Ar/H2 plasma gas |

| | | Bond coat layer | PVC layer | DVC layer |
|---|---|---|---|---|
| Material | | Amdry 955C | See Examples below | |
| Composition | | CoNiCrAlYi | 8YSZ | Gd2Zr2O7 |
| Gun current | Amps | 500 | 540 | 500 |
| Voltage | Volts | 91 | 106 | 91 |
| Gun power | kW | 45.4 | 57 | 46 |
| Argon flow | Nlpm | 50 | 90 | 70 |
| Hydrogen flow | Nlpm | 4 | 7.5 | 5 |
| Powder feed rate | g/min × 1 | 45 | 90 | 40 |

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An erosion and calcium-magnesium-aluminum-silicate (CMAS) resistant coating comprising:

at least one porous vertically cracked (PVC) coating layer providing coefficient of thermal expansion (CTE) mitigation is disposed over a thermal barrier coating (TBC) that includes a layer of MCrAlY, wherein M represents Ni, Co or their combinations; and at least one dense vertically cracked (DVC) erosion and CMAS resistant coating layer deposited over the at least one PVC coating layer, wherein the PVC coating layer includes a range of between 20 and 200 substantially vertical cracks per inch.

2. The coating of claim 1, wherein the at least one DVC layer is a top layer.

3. The coating of claim 1, wherein the at least one dense vertically cracked (DVC) erosion and CMAS resistant coating layer comprises rare earth (Re) stabilized ZrO2 with rare earth oxide or Re stabilized HfO2 mixed with rare earth oxide.

4. The coating of claim 1, wherein the at least one dense vertically cracked (DVC) erosion and CMAS resistant coating layer comprises Re stabilized ZrO2 with rare silicate or Re stabilized HfO2 mixed with rare earth silicate.

5. The coating of claim 1, wherein the at least one dense vertically cracked (DVC) erosion and CMAS resistant coating layer comprises Re stabilized ZrO2 with rare aluminate or Re stabilized HfO2 mixed with rare earth aluminate.

6. The coating of claim 1, wherein the at least one dense vertically cracked (DVC) erosion and CMAS resistant coating layer comprises Re stabilized ZrO2 with rare earth aluminate or silicate or Re stabilized HfO2 mixed with rare earth aluminate or silicate.

7. The coating of claim 1, wherein the at least one dense vertically cracked (DVC) erosion and CMAS resistant coating layer comprises Re stabilized ZrO2 with alkaline oxide or Re stabilized HfO2 mixed with alkaline oxide.

8. The coating of claim 1, wherein the at least one dense vertically cracked (DVC) erosion and CMAS resistant coating layer comprises Re stabilized ZrO2 with gadolinium zirconate or Re stabilized HfO2 mixed with gadolinium zirconate.

9. The coating of claim 1, wherein the at least one dense vertically cracked (DVC) erosion and CMAS resistant coating layer comprises a mixture of a mixture of two or more of:

Re stabilized ZrO2 with rare earth oxide or Re stabilized HfO2 mixed with rare earth oxide;

Re stabilized ZrO2 with rare earth silicate or Re stabilized HfO2 mixed with rare earth silicate;

Re stabilized ZrO2 with rare earth aluminate or Re stabilized HfO2 mixed with rare earth aluminate;

Re stabilized ZrO2 with rare earth aluminate or silicate or Re stabilized HfO2 mixed with rare earth aluminate or silicate;

Re stabilized ZrO2 with alkaline oxide or Re stabilized HfO2 mixed with alkaline oxide; and Re stabilized ZrO2 with gadolinium zirconate or Re stabilized HfO2 mixed with gadolinium zirconate.

10. The coating of claim 1, wherein the at least one dense vertically cracked (DVC) erosion and CMAS resistant coating layer comprises full thickness vertical cracks.

11. The coating of claim 1, wherein the at least one porous vertically cracked (PVC) coating layer comprises full thickness vertical cracks.

12. An erosion and CMAS resistant coating according to claim 1 arranged on a substrate.

13. The coating of claim 12, further comprising at least one bond coating layer disposed between the TBC and the substrate.

14. The coating of claim 12, wherein the substrate is a superalloy substrate.

15. A method of plasma spraying an erosion and CMAS resistant coating on an TBC coated substrate, comprising:

depositing at least one porous vertically cracked (PVC) thermal barrier coating layer providing coefficient of thermal expansion (CTE) mitigation onto the TBC coated substrate; and depositing a dense vertically cracked (DVC) erosion and CMAS resistant coating material over the at least one PVC thermal barrier coating layer, wherein the PVC thermal barrier coating layer includes a range of between 20 and 200 substantially vertical cracks per inch.

16. The method of claim 15, wherein the TBC coated substrate comprises at least one bond coating layer arranged between an TBC layer and the substrate.

17. The method of claim 15, wherein the plasma spraying comprises one of:

atmospheric plasma spraying (APS);

plasma spray-physical vapor deposition (PS-PVD); or suspension plasma spray (SPS).

* * * * *